US011448918B2

(12) United States Patent
Lee et al.

(10) Patent No.: US 11,448,918 B2
(45) Date of Patent: Sep. 20, 2022

(54) GRATING DEVICE, SCREEN INCLUDING THE GRATING DEVICE, METHOD OF MANUFACTURING THE SCREEN AND DISPLAY APPARATUS FOR AUGMENTED REALITY AND/OR VIRTUAL REALITY INCLUDING THE SCREEN

(71) Applicants: SAMSUNG ELECTRONICS CO., LTD., Suwon-si (KR); THE BOARD OF TRUSTEES OF THE LELAND STANFORD JUNIOR UNIVERSITY, Stanford, CA (US)

(72) Inventors: Sunghoon Lee, Seoul (KR); Mark L. Brongersma, Menlo Park, CA (US); Brandon Born, Redwood City, CA (US)

(73) Assignees: SAMSUNG ELECTRONICS CO., LTD., Suwon-si (KR); The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/777,176

(22) Filed: Jan. 30, 2020

(65) Prior Publication Data
US 2020/0241353 A1 Jul. 30, 2020

Related U.S. Application Data

(60) Provisional application No. 62/798,577, filed on Jan. 30, 2019.

(30) Foreign Application Priority Data

Mar. 28, 2019 (KR) .......................... 10-2019-0036218

(51) Int. Cl.
*G02B 5/18* (2006.01)
*G02F 1/1335* (2006.01)
(Continued)

(52) U.S. Cl.
CPC ..... *G02F 1/133504* (2013.01); *G02B 5/1819* (2013.01); *G02B 5/1866* (2013.01);
(Continued)

(58) Field of Classification Search
CPC ...... G02B 5/18; G02B 5/1866; G02B 5/1819; G02B 27/0101; G02B 2027/0118;
(Continued)

(56) References Cited

U.S. PATENT DOCUMENTS

2002/0003661 A1* 1/2002 Nakai ................ G02B 27/4261
359/569
2012/0038987 A1* 2/2012 Iizuka .................. G02B 5/1866
359/573
(Continued)

FOREIGN PATENT DOCUMENTS

KR 101868405 B1 6/2018

*Primary Examiner* — Mariam Qureshi
(74) *Attorney, Agent, or Firm* — Sughrue Mion, PLLC

(57) ABSTRACT

Provided are a grating device, a screen including the grating device, a method of manufacturing the screen, and a display apparatus including the screen. The grating device includes a transparent substrate and a diffraction grating arranged on the transparent substrate, the diffraction grating includes a plurality of meta-diffraction patterns, and each meta-diffraction pattern has a curved shape with a center of curvature provided in a direction parallel to the substrate. The screen includes a first polarizer, a second polarizer arranged next to the first polarizer, and a diffraction grating that is transparent to polarized light that has passed through the second polarizer and reflects polarized light having a polarization direction perpendicular to the polarized light, wherein the diffraction grating includes a plurality of meta-diffraction patterns, each meta-diffraction pattern having a curved shape with a center of curvature positioned in a travelling direction of incident light.

8 Claims, 18 Drawing Sheets

(51) Int. Cl.
*G02B 5/30* (2006.01)
*G02B 27/01* (2006.01)

(52) U.S. Cl.
CPC ....... *G02B 5/3058* (2013.01); *G02B 27/0172* (2013.01); *G02F 1/133528* (2013.01); *G02B 2027/0178* (2013.01); *G02F 1/133548* (2021.01)

(58) Field of Classification Search
CPC ...... G02B 2027/012; G02B 2027/0121; G02B 2027/015; G02F 2201/30; G02F 2001/133548; B60R 2300/205; G03B 21/604
See application file for complete search history.

(56) References Cited

U.S. PATENT DOCUMENTS

| | | |
|---|---|---|
| 2012/0050141 A1 | 3/2012 | Border et al. |
| 2013/0088781 A1* | 4/2013 | Suenaga .......... B29D 11/00269 |
| | | 359/566 |
| 2016/0055822 A1 | 2/2016 | Bell |
| 2017/0108697 A1 | 4/2017 | El-Ghoroury et al. |
| 2018/0081190 A1* | 3/2018 | Lee ..................... G02F 1/13362 |
| 2018/0180793 A1* | 6/2018 | Fattal ................. G02B 27/0172 |
| 2018/0234675 A1* | 8/2018 | Cheng ................ G02B 27/0172 |
| 2018/0284460 A1 | 10/2018 | Cheng et al. |
| 2020/0064552 A1* | 2/2020 | Fattal ................... H04N 13/305 |
| 2020/0073031 A1 | 3/2020 | Born et al. |
| 2020/0150332 A1* | 5/2020 | Nakamura ............... G02B 5/04 |
| 2020/0158943 A1* | 5/2020 | Calafiore ........... G02B 27/0172 |
| 2020/0225586 A1* | 7/2020 | Feldmann ............... G03F 7/702 |

* cited by examiner

GRATING DEVICE, SCREEN INCLUDING THE GRATING DEVICE, METHOD OF MANUFACTURING THE SCREEN AND DISPLAY APPARATUS FOR AUGMENTED REALITY AND/OR VIRTUAL REALITY INCLUDING THE SCREEN

CROSS-REFERENCE TO RELATED APPLICATIONS

This application is based on and claims priority under 35 U.S.C. § 119 to U.S. Provisional Application No. 62/798,577, filed on Jan. 30, 2019, in the United States Patent and Trademark Office, and Korean Patent Application No. 10-2019-0036218, filed on Mar. 28, 2019, in the Korean Intellectual Property Office, the disclosures of which are incorporated by reference herein in their entireties.

BACKGROUND

1. Field

The disclosure relates to grating elements and devices using the grating elements, and more particularity, grating devices, screens including the grating devices, methods of manufacturing the screens, and display apparatuses for augmented reality and/or virtual reality including the screens.

2. Description of Related Art

Virtual reality is a computer-generated virtual world, and is also called artificial reality or cyber space. Virtual reality may be used in various fields, for example, in experiment practice in science or the medical field, and it may bring about the same effect as an actual experiment. Education with a high immersion level is possible with virtual reality.

Virtual reality is designed for a user to experience a sense of sight and hearing as in the real world by being connected to a virtual world created by a computer program. Augmented reality is different from virtual reality in that augmented reality shows superimposed virtual objects through a hologram in a real space that is actually present in the field of view of the user.

Augmented reality is realized by adding virtual information to a real environment, and may be found in location-based services of smart phones. In virtual reality, an actual environment may not be seen, but augmented reality in which virtual information is added to a real environment is a technology that provides further realism and additional information to real-world images.

SUMMARY

Provided are grating devices configured to increase diffraction efficiency with respect to a high incident angle.

Provided are screens configured to increase a viewing angle by including the grating devices.

Provided are screens configured to selectively display augmented reality (AR) and/or virtual reality by including the grating devices.

Provided are methods of manufacturing the screens.

Provided are display apparatuses for augmented reality and/or virtual reality capable of controlling contrast with a wide viewing angle by including the screens.

Additional aspects will be set forth in part in the description which follows and, in part, will be apparent from the description, or may be learned by practice of embodiments.

In accordance with an aspect of the disclosure, a grating device includes a substrate; and a diffraction grating on the substrate; wherein the diffraction grating includes a plurality of meta-diffraction patterns, and wherein each meta-diffraction pattern from among the plurality of meta-diffraction patterns has a curved shape with a center of curvature provided in a direction parallel to the substrate.

Each meta-diffraction pattern from among the plurality of meta-diffraction patterns may have a respective height that causes, for light that is incident at an angle greater than 45° with respect to the plurality of meta-diffraction patterns, destructive interference between light reflected by an upper surface of the meta-diffraction pattern and light reflected by a bottom surface of the meta-diffraction pattern.

The grating device may further include a dielectric layer arranged between the substrate and the diffraction grating, wherein a thickness of the dielectric layer is an integral multiple of a wavelength of incident light.

A refractive index of the diffraction grating may be in a range from about 1.35 to about 2.5.

The plurality of meta-diffraction patterns may include a group of meta-diffraction patterns, and each meta-diffraction pattern from among the group of meta-diffraction patterns may include a main diffraction pattern and an auxiliary diffraction pattern.

Each meta-diffraction pattern from among the plurality of meta-diffraction patterns may show a respective diffraction characteristic that depends on a formed location of the meta-diffraction pattern.

The plurality of meta-diffraction patterns may include a group of meta-diffraction patterns, and each meta-diffraction pattern from among the group of meta-diffraction patterns may include only a main diffraction pattern.

The substrate may include a reflection wire grid polarizer.

A respective dimension of each meta-diffraction pattern from among the plurality of meta-diffraction patterns may be less than a wavelength of light incident to the plurality of meta-diffraction patterns.

The auxiliary diffraction patterns may be arranged so that a negative diffraction angle range having a high diffraction efficiency is obtained as the number of auxiliary diffraction patterns increases.

In accordance with an aspect of the disclosure, a screen includes a first polarizer; a second polarizer arranged next to the first polarizer; and a diffraction grating that is transparent to first polarized light that has passed through the second polarizer and reflects second polarized light having a polarization direction perpendicular to a polarization direction of the first polarized light, wherein the diffraction grating includes a plurality of meta-diffraction patterns, and wherein each meta-diffraction pattern from among the plurality of meta-diffraction patterns has a curved shape with a center of curvature positioned in a travelling direction of incident light.

Polarization characteristics of the first polarizer may be equal to polarization characteristics of the second polarizer.

Polarization characteristics of the first polarizer may be opposite to polarization characteristics of the second polarizer.

The first polarizer may be configured to rotate about an optical axis of the screen.

The screen may further include a liquid crystal layer between the first polarizer and the second polarizer.

The second polarizer may include a reflective wire grid polarizer.

Polarization characteristics of the first polarizer may be equal to polarization characteristics of the second polarizer.

The liquid crystal layer may be configured to form a liquid crystal arrangement state that is transparent to polarized light The liquid crystal layer may be configured to form a liquid crystal arrangement state that rotates polarized light that has passed through the first polarizer by 90°.

A respective dimension of each meta-diffraction pattern from among the plurality of meta-diffraction patterns may be less than a wavelength of light incident to the plurality of meta-diffraction patterns.

A display apparatus may include the screen in accordance with the above-noted aspect of the disclosure, on which an image is displayed; and an image supply unit configured to supply a virtual reality image to the screen.

The display apparatus may further include a reflective member that is arranged between the screen and the image supply unit and that reflects the virtual reality image towards the screen.

The reflective member may be arranged so that an incident angle of the virtual reality image with respect to the screen is not less than 45° or not greater than 90°.

The screen may include a first screen corresponding to a left eye of a user; and a second screen corresponding to a right eye of the user, wherein the first screen and the second screen are mounted on an eyeglasses frame.

In accordance with an aspect of the disclosure, a method of manufacturing a screen includes forming a second polarizer on a first polarizer; forming a transparent intermediate material layer on the second polarizer; and forming a diffraction grating on the transparent intermediate material layer, the diffraction grating being transparent to first polarized light that has passed through the second polarizer and reflecting second polarized light having a polarization direction perpendicular to a polarization direction of the first polarized light, wherein the diffraction grating includes a plurality of meta-diffraction patterns, and wherein each meta-diffraction pattern from among the plurality of meta-diffraction patterns has a curved shape with a center of curvature positioned in a travelling direction of incident light.

The forming of the second polarizer may include forming a plurality of wire grid polarizer patterns on a substrate.

The forming of the transparent intermediate material layer may include forming the transparent intermediate material layer to cover the plurality of wire grid polarizer patterns and fill an area between the plurality of wire grid polarizer patterns on the substrate.

The forming of the transparent intermediate material layer may include forming the transparent intermediate material layer to cover the plurality of wire grid polarizer patterns on the substrate so that voids are formed between the plurality of wire grid polarizer patterns.

A respective dimension of each meta-diffraction pattern from among the plurality of meta-diffraction patterns may be less than a wavelength of light incident to the plurality of meta-diffraction patterns.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 11 and 12 are perspective views showing cases that the display apparatus of FIG. 10 is formed as a glasses type, wherein FIG. 11 shows augmented reality and FIG. 12 shows virtual reality.

DETAILED DESCRIPTION

Figure 1:
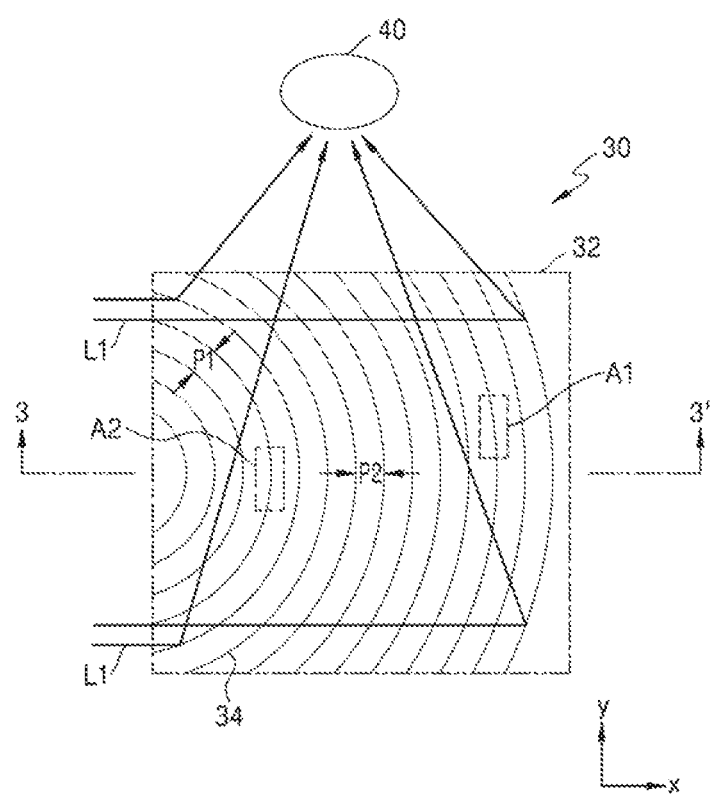
FIG. 1 is a plan view of a grating device according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a grating device, a screen including the grating device, a method of manufacturing the screen, and a display apparatus for augmented reality and/or virtual reality will be described in detail with reference to the accompanying drawings. In the drawings, thicknesses of layers or regions may be exaggerated for clarity of the specification.

FIG. 1 shows a grating device 30 according to an embodiment.

Referring to FIG. 1, the grating device 30 includes a substrate 32 and a plurality of diffraction patterns 34 on the substrate 32. The transparency of the grating device 30 may vary according to polarization characteristics of incident light L1. For example, when incident light L1 is P-polarized light, an average transparency of the grating device 30 may be greater than 90%. That is, the grating device 30 may be transparent with respect to the P-polarized light. However, when the incident light L1 is S-polarized light, the grating device 30 may not be transparent with respect to the incident light L1. For example, when the incident light L1 is S-polarized light, the incident light L1 may be reflected by the grating device 30. Accordingly, the plurality of diffraction patterns 34 formed on the grating device 30 may be formed considering the polarization characteristics of the grating device 30. The substrate 32 may be transparent with respect to the incident light L1. For example, the substrate 32 may include a $SiO_2$ substrate. As shown in FIG. 1, the plurality of diffraction patterns 34 are separated from each other. For convenience, the plurality of diffraction patterns 34 may collectively be referred to as a grating or a grating layer. All of the plurality of diffraction patterns 34 are formed in a curved type (i.e., have a curved shape). The plurality of diffraction patterns 34 may be provided in such a manner that a wave source spreads in a direction in which incident light travels. In other words, the plurality of diffraction patterns 34 may be concavely arranged (convexly in a travelling direction of the incident light L1) with respect to the incident light L1. In other words, the grating may have a shape similar to that of an advancing spherical wave. The curvature of some of the plurality of diffraction patterns 34 may be different from the remaining diffraction patterns 34. For example, the curvatures of the plurality of diffraction patterns 34 may gradually increase in an x-axis direction as shown in FIG. 1, which is a travelling direction of the incident light L1. In an embodiment, the curvatures of first some (i.e., a first group) of the plurality of diffraction patterns 34 in the x-axis direction may be equal to each other, the curvatures of the remaining diffraction patterns 34 may be different from the curvatures of the first some of the diffraction patterns 34, and the curvatures of the remaining diffraction patterns 34 may gradually increase in the x-axis direction. The increasing degree of the curvatures of the plurality of diffraction patterns 34 may be controlled in a manufacturing process considering the wavelength of light used. The curvatures of the plurality of diffraction patterns 34 may vary according to regions, and thus, pitches between the plurality of diffraction patterns 34 may vary according to the regions where the plurality of diffraction patterns 34 are arranged. For example, some of the plurality of diffraction patterns 34 may be distributed to have a first pitch P1, and some other ones of the plurality of diffraction patterns 34 may be distributed to have a second pitch P2, wherein the second pitch P2 is different from the first pitch P1. In an embodiment, the pitches of the plurality of diffraction patterns 34 may all be different from each other. For example, the pitches of the plurality of diffraction patterns 34 may be gradually reduced or increased in the x-axis direction. Also, the pitches, for example, the second pitches P2 of two adjacent diffraction patterns of the plurality of diffraction patterns 34 may vary according to diffraction patterns. That is, the second pitch P2 may increase or decrease up or down in a y-axis direction from a central region. For example, the pitch of a single diffraction pattern may vary along the length of the diffraction pattern. The first pitch P1 may also be similarly changed.

The grating device 30 may affect the travelling direction of the incident light L1 by diffracting the incident light L1. The change of the travelling direction of the incident light L1 is generated by the plurality of diffraction patterns 34. The plurality of diffraction patterns 34 diffract the incident light L1 so that the incident light L1 travels to a user 40. When the plurality of diffraction patterns 34 are formed, the dimensions (height, pitch, curvature, refractive index, etc.) of the plurality of diffraction patterns 34 may be determined in consideration of the above. The plurality of diffraction patterns 34 may be a plurality of meta-patterns. That is, the plurality of diffraction patterns 34 may be a plurality of meta-diffraction patterns. Accordingly, a meta-surface including the plurality of diffraction patterns 34 may be present on the substrate 32. Because the plurality of diffraction patterns 34 may be meta-patterns, one or more of the dimensions, for example, height, width, pitch, etc. may be less than a wavelength of the incident light L1. For example, the height, width, pitch, etc. of the plurality of diffraction patterns 34 may be ½ or less of a wavelength of the incident light L1. The incident light L1 may be S-polarized light or may include S-polarized light. The plurality of diffraction patterns 34 are transparent with respect to P-polarized light and reflect S-polarized light. An average transparency of the plurality of diffraction patterns 34 with respect to P-polarized light may be greater than 90%, for example, greater than 92%. When the grating device 30 is used in a virtual reality display apparatus, the incident light L1 may be S-polarized light including a virtual reality image. Accordingly, the plurality of diffraction patterns 34 may be used for reflecting the virtual reality image.

The plurality of diffraction patterns 34 include materials that satisfy the polarization characteristic, and may have a refractive index of 2.5 or less. For example, the refractive index of the plurality of diffraction patterns 34 may be in a range from about 1.35 to about 2.5. The plurality of diffraction patterns 34 may be formed with a low loss dielectric material, such as a polymer or $SiO_2$. The plurality of diffraction patterns 34 may be formed using a nano implant manufacturing method, and thus, a grating device 30 having a large diameter may be readily formed with a low manufacturing cost. Therefore, the grating device 30 according to an embodiment may be useful for manufacturing a large diameter display. Here, 'low loss' indicates that absorption loss of incident light is low. That is, the absorption loss of incident light by the plurality of diffraction patterns 34 is low. The height of the plurality of diffraction patterns 34 may be determined in connection with a wavelength of the incident light L1. In this way, zeroth order diffraction light may be removed through destructive interference. For example, a path difference is generated between light reflected by upper surfaces of the plurality of diffraction patterns 34 and light reflected by bottom surfaces of the plurality of diffraction patterns 34, and, in this case, a height of the plurality of diffraction patterns 34 may be set to a height that satisfies a condition that the path difference causes destructive interference between the light reflected by the upper surfaces of the plurality of diffraction patterns 34 and the light reflected by the bottom surfaces of the plurality of diffraction patterns 34. The height characteristics may increase diffraction efficiency. The plurality of diffraction patterns 34 may also be arranged to have a given fill factor. The fill factor is defined as a grating coverage present on a single period. In other words, the fill factor is the fraction of the individual diffraction pattern covered by the upper surface of the individual diffraction pattern. For example, the fill factor of the plurality of diffraction patterns 34 may be set so that, excluding the light lost by absorption, the percentage of light reflected at the upper surface of each of the plurality of diffraction patterns 34 with respect to incident light is equal to the percentage of light reflected at the bottom surface of each of the plurality of diffraction patterns 34. The fill factor may vary depending on incident light, light absorbance, refractive index of the diffraction pattern 34, etc. The lower the refractive index of the plurality of diffraction patterns 34, the larger the fill factor may be required.

Figure 2:
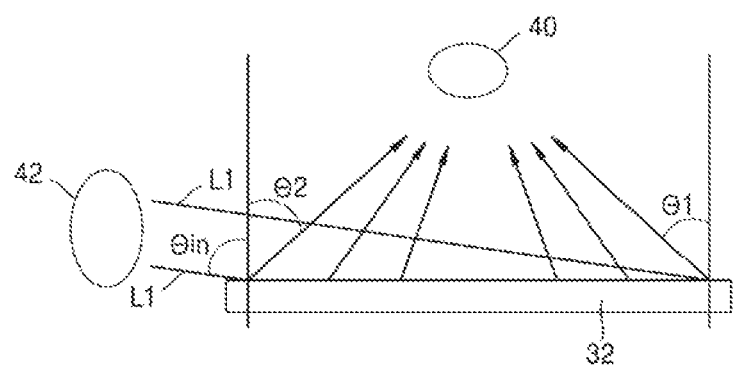
FIG. 2 is a lateral view of FIG. 1.

FIG. 2 is a lateral view of FIG. 1. In FIG. 2, for convenience, the plurality of diffraction patterns 34 are omitted.

Referring to FIGS. 1 and 2, light L1 incident to the grating device 30 may enter an entire region of the grating device 30 on which the plurality of diffraction patterns 34 are formed.

Because the incident light L1 is diffracted by the plurality of diffraction patterns 34 and is directed to a user 40, the diffraction directions of the incident light L1 incident to different regions in the region where the plurality of diffraction patterns 34 are formed are different from each other. For example, as depicted in FIG. 2, when the incident light L1 enters a left-end of the substrate 32 from a light source 42, the incident light L1 is diffracted in a direction opposite to the direction of the light source 42 with a second output angle θ2 and is incident to the user 40. The second output angle θ2 may be, for example, greater than 55°. On the other hand, when the incident light L1 enters a right-end of the substrate 32, the incident light L1 is diffracted in a direction towards the direction of the light source 42 with a first output angle θ1 and is incident to the user 40. The first output angle θ1 may be, for example, greater than 55°. When the first and second output angles θ1 and θ2 are considered, the grating device 30 may provide a wide viewing angle greater than 110°. Accordingly, in the case of a display to which the grating device 30 is applied, a viewing angle of at least 110° may be ensured.

Next, when the incident light L1 enters a region between the left-end and the right-end of the substrate 32, depending on the incident location of the incident light L1, the incident light L1 may be diffracted with an output angle less than the second output angle θ2 in a direction away from the light source 42 or may be diffracted with an output angle less than the first output angle θ1 in a direction towards the light source 42. In FIG. 2, an incident angle θ in of the incident light L1 may be in a range from about 45° to about 90°, for example, in a range from about 75° to about 90°. In this way, the first and second output angles θ1 and θ2 of the incident light L1 that enters the region of the substrate 32, where the plurality of diffraction patterns 34 are formed, and is diffracted by the diffraction pattern 34 may vary according to the regions of the substrate 32 to which the incident light L1 enters. The first and second output angles θ1 and θ2, that is, the diffraction directions of the diffracted light, are related to the dimensions and the configurations of the diffraction patterns. Accordingly, the dimensions or the configurations of the plurality of diffraction patterns 34 may vary according to the locations where the plurality of diffraction patterns 34 are formed. The descriptions about the relationship between the dimensions or the configurations of the diffraction patterns and the diffraction directions (or output angles) are disclosed in detail in Korean Patent Application No. 2018-141133 (Nov. 15, 2018).

As depicted in FIGS. 1 and 2, the grating device 30 may focus the incident light L1 onto the user 40 like a lens. In this case, the numerical aperture (NA) of the grating device 30 may be, for example, approximately 0.82.

Figure 3:
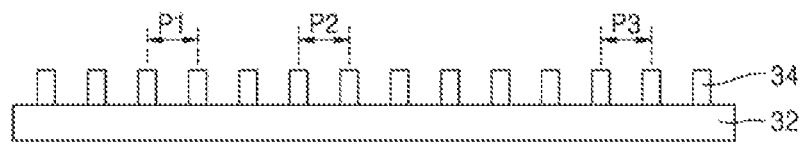
FIG. 3 is a cross-sectional view taken along line 3-3' of FIG. 1.

FIG. 3 is a cross-sectional view taken along the line 3-3' of FIG. 1.

Referring to FIG. 3, the plurality of diffraction patterns 34 are arranged on the substrate 32. The plurality of diffraction patterns 34 are separated from each other. Some of the plurality of diffraction patterns 34 are arranged with the first pitch P1, some of the remaining diffraction patterns 34 are arranged with the second pitch P2, and the remaining diffraction patterns 34 are arranged with a third pitch P3. The pitch of a diffraction pattern is the distance from a point on the diffraction pattern to a corresponding point on an adjacent diffraction pattern. The first through third pitches P1 through P3 may be equal to each other or different from each other, and some of the first through third pitches P1 through P3 may be equal to each other and some other ones of the first through third pitches P1 through P3 may be different from each other. For example, the first pitch P1 may be the largest and the third pitch P3 may be the smallest. The variation of the pitches may be related to a distance between the light source 42 and each of the plurality of diffraction patterns 34. Although it is depicted that the plurality of diffraction patterns 34 have the same height and width for convenience, the height of some of the plurality of diffraction patterns 34 may be different from others. Also, the configuration of each of the plurality of diffraction patterns 34 may be different according to the location where each of the diffraction patterns 34 is located, which will be described below.

Figure 4:
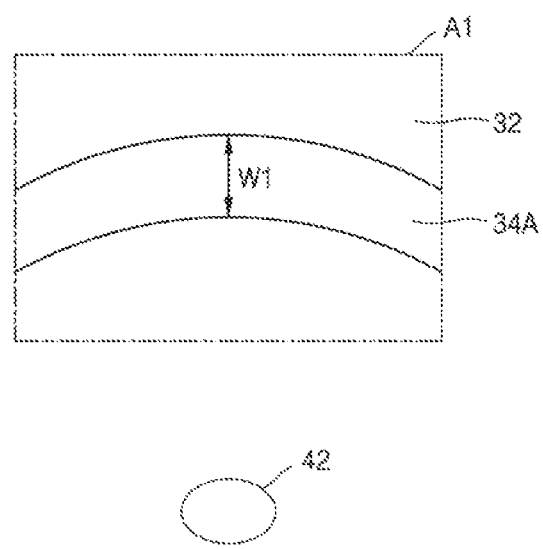
FIG. 4 is a magnified plan view of the first region A1 of FIG. 1.

FIG. 4 is a magnified plan view of the first region A1 of FIG. 1.

Referring to FIG. 4, the first region A1 includes a single first diffraction pattern (i.e., a main diffraction pattern) 34A formed on the substrate 32. The first diffraction pattern 34A is bent. That is, the first diffraction pattern 34A is concave with respect to the light source 42, and is convex in a travelling direction of incident light L1 in a direction away from the light source 42. In other words, the first diffraction pattern 34A may be a curved shape on the substrate 32 that has a center of curvature positioned in a direction of the light source 42. The first diffraction pattern 34A has a width W1. The width W1 may be equal in all of the plurality of diffraction patterns 34, or may be different according to the locations where the plurality of diffraction patterns 34 are formed.

Figure 5:
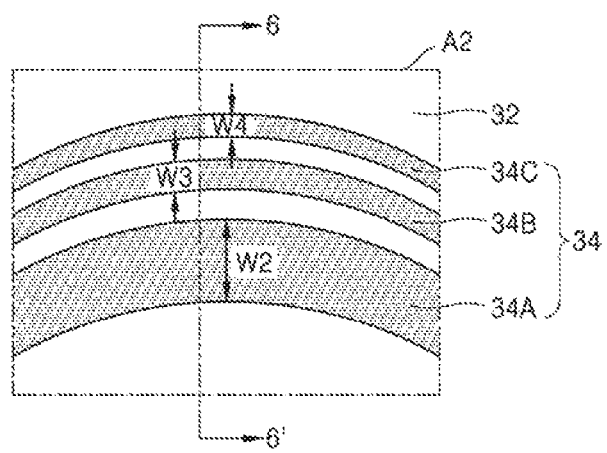
FIG. 5 is a magnified view of a second region A2 of FIG. 1.

FIG. 5 is a magnified view of a second region A2 of FIG. 1.

Referring to FIG. 5, the diffraction pattern 34 includes a plurality of diffraction elements, for example, a main diffraction pattern 34A, a first auxiliary diffraction pattern 34B, and a second auxiliary diffraction pattern 34C, in the second region A2. All of the main diffraction pattern 34A and the first and second auxiliary diffraction patterns 34B and 34C are bent and parallel to each other. A width W2 of the main diffraction pattern 34A is greater than widths W3 and W4 of the first and second auxiliary diffraction patterns 34B and 34C, respectively. The widths W3 and W4 of the first and second auxiliary diffraction patterns 34B and 34C may be equal to or different from each other. In an embodiment, the diffraction pattern 34 may include one auxiliary diffraction pattern, for example, the first auxiliary diffraction pattern 34B, together with the main diffraction pattern 34A. In an embodiment, the diffraction pattern 34 may further include a third auxiliary pattern. The auxiliary diffraction patterns may be arranged so that a negative diffraction angle range having a high diffraction efficiency may be obtained as the number of auxiliary diffraction patterns increases. The second order or higher-order diffracted light may be removed by controlling the number of auxiliary diffraction patterns included in the diffraction pattern 34. Also, zeroth-order diffracted light may be removed by setting a height H1 (refer to FIG. 6) of the main diffraction pattern 34A to a height that satisfies a condition of off-setting the zeroth-order diffracted light. When the main diffraction pattern 34A satisfies the condition, the main diffraction pattern 34A may have a height at which light reflected from an upper surface of the main diffraction pattern 34A and light reflected from a bottom surface of the main diffraction pattern 34A respectively offset (i.e., destructively interfere with) each other. Accordingly, a diffraction efficiency of first-order diffracted light with respect to light entering with an incident angle greater than 45° may be increased. Also, an output angle may be increased, and as a result, a viewing angle may be increased. The diffraction characteristics related to the main diffraction pattern 34A and the first and second auxiliary diffraction patterns 34B and 34C are described in detail in the Korean Patent Application described above.

Figure 6:
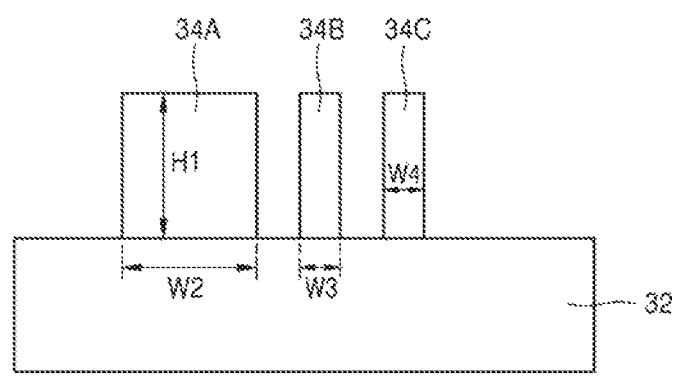
FIG. 6 is a cross-sectional view taken along line 6-6' of FIG. 5.

FIG. 6 is a cross-sectional view taken along line 6-6' of FIG. 5.

Referring to FIG. 6, the main diffraction pattern 34A and the first and second auxiliary diffraction patterns 34B and 34C have the same height H1. The main diffraction pattern 34A and the first and second auxiliary diffraction patterns 34B and 34C are separated by the same gaps, but the gaps may be different from each other. For example, the gap between the main diffraction pattern 34A and the first auxiliary diffraction pattern 34B may be greater than that between the first auxiliary diffraction pattern 34B and the second auxiliary diffraction pattern 34C. As shown, the widths W2, W3, and W4 of the main diffraction pattern 34A and the first and second auxiliary diffraction patterns 34B and 34C may be different from each other.

Meanwhile, in the case of the diffraction patterns 34 in other regions besides the second region A2, the number of auxiliary diffraction patterns accompanied by the main diffraction pattern 34A may be one or more.

Next, a screen that includes the grating device 30 described above and that may be used to display an augmented reality and/or virtual reality image according to an embodiment will be described.

Figure 7:
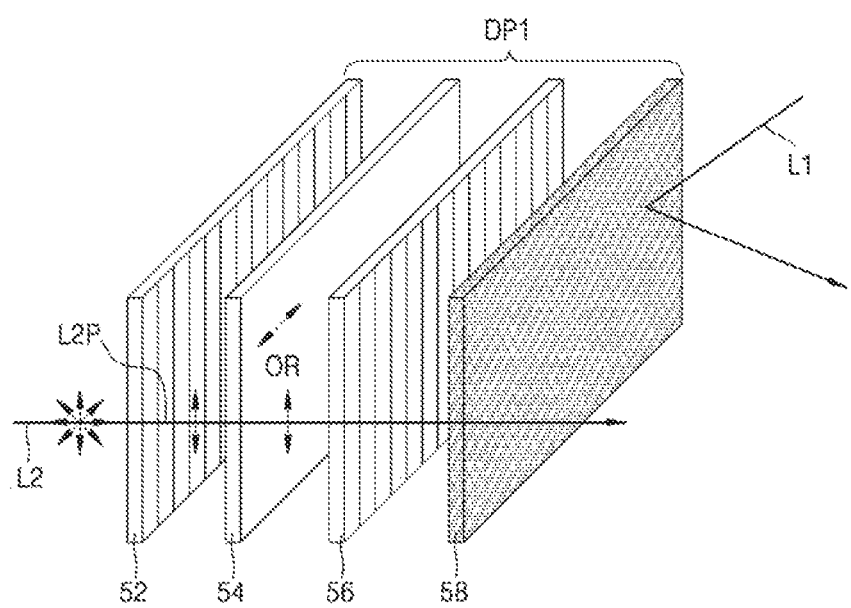
FIG. 7 is a perspective view of a first screen for augmented reality and/or virtual reality including a grating device according to an embodiment.

FIG. 7 is a perspective view of a screen (hereinafter, a first screen DP1) that includes a grating device according to an embodiment and that is used for augmented reality and/or virtual reality.

Referring to FIG. 7, the first screen DP1 includes a first polarizer 52, a liquid crystal layer 54, a second polarizer 56, and a diffraction plate 58. As an example, a combination of the second polarizer 56 and the diffraction plate 58 may correspond to the grating device described with reference to FIGS. 1 through 5. That is, the second polarizer 56 may be the substrate 32 of the grating device 30 described with reference to FIGS. 1 through 5, and the diffraction plate 58 may be a meta-layer including the plurality of diffraction patterns 34 of the grating device 30 described with reference to FIGS. 1 through 5. In an example, the diffraction plate 58 may be the grating device 30 described with reference to FIGS. 1 through 5. In this case, the substrate 32 of the grating device 30 may be a dielectric layer inserted between the second polarizer 56 and the plurality of diffraction patterns 34. The first polarizer 52 may include an absorption or reflection polarizer. The first polarizer 52 may be a polarizer that is transparent with respect to P-polarized light and that blocks S-polarized light. Accordingly, when external natural light L2 passes through the first polarizer 52, the external natural light L2 becomes P-polarized light L2P. Accordingly, the P-polarized light L2P enters the liquid crystal layer 54. The liquid crystal layer 54 may be a layer including a liquid crystal used for a liquid crystal display LCD. The liquid crystal layer 54 may be configured to transmit, with or without rotating, linearly polarized light incident to the liquid crystal layer 54 according to an applied voltage. The degree of rotation of the liquid crystal in the liquid crystal layer 54 may be controlled by controlling a voltage applied to the liquid crystal layer 54. Thus, the degree of rotation of linearly polarized light incident to the liquid crystal layer 54 may be controlled by controlling a voltage applied to the liquid crystal layer 54. As an example, the P-polarized light L2P incident to the liquid crystal layer 54 may be rotated by 90° by controlling a voltage applied to the liquid crystal layer 54, and, as an example, the P-polarized light L2P may be rotated by an angle between 0° and 90°. As a result, an amount of light incident to the second polarizer 56 through the liquid crystal layer 54 may be controlled through voltage control of the liquid crystal layer 54.

In the first screen DP1, when the P-polarized light L2P enters the liquid crystal layer 54, according to whether voltage is applied to the liquid crystal layer 54 or not, either P-polarized (unrotated) light or S-polarized (rotated) light may enter the second polarizer 56. The second polarizer 56 may have the same polarization characteristics as the first polarizer 52. Accordingly, the second polarizer 56 is transparent with respect to P-polarized light and blocks or reflects S-polarized light. The second polarizer 56 may include, for example, a reflection type wire grid polarizer. When the operation characteristics of the first and second polarizers 52 and 56 and the liquid crystal layer 54 are considered, depending on the application of a voltage to the liquid crystal layer 54, a portion of the light L2 incident from the outside may be blocked and only the P-polarized light L2P of external light L2 may reach the diffraction plate 58. The P-polarized light L2P reaching the diffraction plate 58 may include an image of the outside of the first screen DP1, that is, an image of the real world. The diffraction plate 58 is transparent with respect to the P-polarized light L2P incident to a rear side of the diffraction plate 58 and reflects the S-polarized light L1 incident to a front side of the diffraction plate 58. A location where the P-polarized light L2P is emitted and a location where the S-polarized light L1 is emitted may be different from each other. In other words, a light source of the P-polarized light L2P and a light source of the S-polarized light L1 may be different from each other. The S-polarized light L1 may include a virtual reality image. The reflection of the S-polarized light L1 by the diffraction plate 58 appears as a result of diffraction of the diffraction plate 58 with respect to the S-polarized light L1. That is, the S-polarized light L1 is diffracted forward (that is, in a travelling direction of the P-polarized light L2P) by the diffraction plate 58, and, as a result, the S-polarized light L1 appears as reflected by the diffraction plate 58. The diffraction plate 58 may be, as described above, the grating device 30 of FIG. 1 or a meta-surface layer including the plurality of diffraction patterns 34 of the grating device 30 of FIG. 1. When the plurality of diffraction patterns 34 of the grating device 30 of FIG. 1 is formed, the shapes or dimensions of the plurality of diffraction patterns 34 may be designed to show the optical reactions with respect to S-polarized light and P-polarized light. The first and second polarizers 52 and 56, the liquid crystal layer 54, and the diffraction plate 58 included in the first screen DP1 of FIG. 7 may contact each other without overlapping regions of the first and second polarizers 52 and 56, the liquid crystal layer 54, and the diffraction plate 58 with each other. Accordingly, the second polarizer 56 and the diffraction plate 58 may be attached to each other, and in this state, the second polarizer 56 may be used as a reflector to reflect light L1 incident to the diffraction plate 58.

The first screen DP1 may be used for both augmented reality and virtual reality, and it may also be used exclusively for augmented reality or exclusively for virtual reality.

When the first screen DP1 is used exclusively for augmented reality, a real world image together with a virtual reality image should reach a user, and thus, the P-polarized light L2P included in the external light L2 should reach the diffraction plate 58. Accordingly, the configuration of a region including the first polarizer 52, the liquid crystal layer 54, and the second polarizer 56 arranged in front of the diffraction plate 58 may be configured so that the P-polarized light L2P reaches the diffraction plate 58. As an example, the liquid crystal layer 54 may be maintained in a state of transmitting the incident P-polarized light L2P without rotation. In an example, the liquid crystal layer 54 may be omitted, or both the liquid crystal layer 54 and the first polarizer 52 may be omitted.

When the first screen DP1 is used exclusively for virtual reality, the transfer of an image of the real world to a user should be blocked, and only a virtual reality image should be transmitted to the user. Accordingly, the liquid crystal layer 54 is maintained in a state of rotating the P-polarized light L2P by 90°, that is, is maintained in a state of converting the P-polarized light L2P to S-polarized light. To maintain the state, a voltage may be applied to the liquid crystal layer 54.

Figure 8:
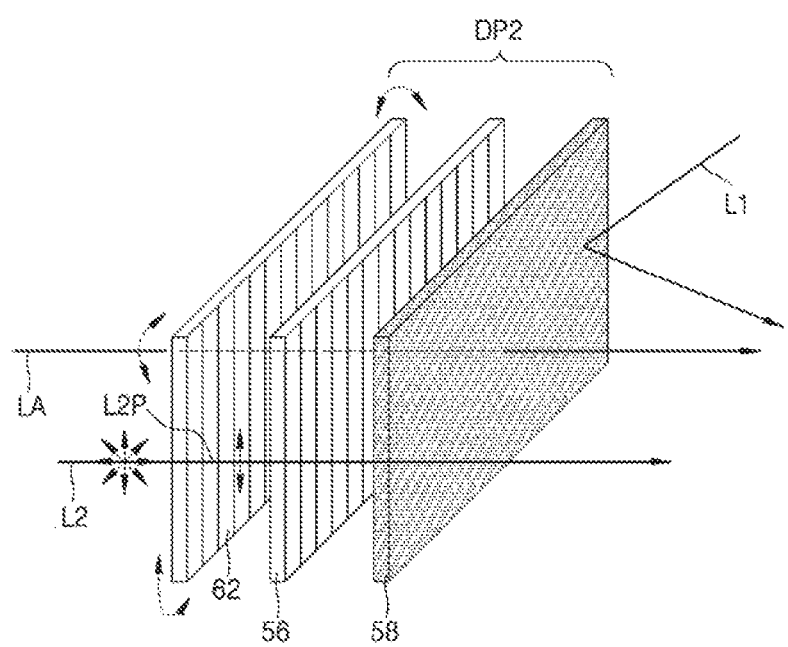
FIG. 8 is a perspective view of a second screen for augmented reality and/or virtual reality including a grating device according to an embodiment.

FIG. 8 is a perspective view of a screen (hereinafter, a second screen DP2) that includes a grating device according to an embodiment and is used for augmented reality and/or virtual reality. Like reference numerals are used to indicate elements identical to the elements in the first screen DP1 described with reference to FIG. 7, and the descriptions thereof will be omitted.

Referring to FIG. 8, the second screen DP2 includes a rotating polarizer 62, a second polarizer 56, and a diffraction plate 58 having a meta-surface. The second polarizer 56 and the diffraction plate 58 may contact each other without overlapping regions of the second polarizer 56 and the diffraction plate 58 with each other. The rotating polarizer 62 may be configured to rotate about an optical axis LA of the second screen DP2 as a center. The rotating polarizer 62 may be rotatably combined with the second polarizer 56. Here, the combination may include a case in which the rotating polarizer 62 and the second polarizer 56 are attached to each other in a range in which the rotation of the rotating polarizer 62 is allowed, and a case in which the rotating polarizer 62 and the second polarizer 56 are combined with each other with another member as a medium. The other member may include a member that facilitates the rotation of the rotating polarizer 62. For rotation of the rotating polarizer 62, a controllable electrical or mechanical element (for example, a step motor, etc.) may be provided. In an embodiment, the rotation of the rotating polarizer 62 may be manually performed, for example, a user may rotate the rotating polarizer 62 to a desired degree by using a hand.

In a state that the rotating polarizer 62 is not rotated, the rotating polarizer 62 may be a polarizer that is transparent with respect to P-polarized light and that blocks S-polarized light, or may include such polarizer. Accordingly, when the rotating polarizer 62 is in an un-rotated state, the P-polarized light L2P may be incident to the second polarizer 56 through the rotating polarizer 62. In an example, the rotating polarizer 62 may be rotated by 90°, or may be rotated to an angle in a range from 0° to 90°, or greater than 90°. Accordingly, through the control of the rotation degree of the rotating polarizer 62, light amount of the P-polarized light L2P reaching the second polarizer 56 may be controlled. Thus, if the P-polarized light L2P is light including an image of an external real world, the brightness of the image of the external real world may be controlled by controlling the rotation degree of the rotating polarizer 62. Accordingly, when the image of the external real world overlaps an image of a virtual real world, the contrast between the image of the external real world and the image of the virtual real world may be controlled by controlling the rotation degree of the rotating polarizer 62.

When the rotating polarizer 62 is rotated by 90°, the rotating polarizer 62 may be transparent to S-polarized light and may block P-polarized light. Accordingly, when the rotating polarizer 62 is rotated by 90°, only S-polarized light may reach the second polarizer 56 through the rotating polarizer 62. The second polarizer 56 is transparent with respect to P-polarized light and blocks S-polarized light. Accordingly, the S-polarized light that reaches the second polarizer 56 may not pass through the second polarizer 56, and as a result, when the rotating polarizer 62 is rotated by 90°, no portion of the external light L2 may reach the diffraction plate 58. Accordingly, light that may be viewed on a backside of the diffraction plate 58 may be only the light L1 irradiated to and reflected from a rear side of the diffraction plate 58. The reflected light appears as a result of diffraction operation of the diffraction plate 58.

The second screen DP2 may be used as a screen of a display apparatus for augmented reality and/or virtual reality, and the second screen DP2 may also be used as a screen of a display apparatus exclusively for augmented reality or exclusively for virtual reality.

For example, when the rotating polarizer 62 is maintained in a state rotated by 90° in the second screen DP2, the rotating polarizer 62 acts as a polarizer that transmits only the S-polarized light, and thus, the polarization states of the rotating polarizer 62 and the second polarizer 56 are perpendicular. Accordingly the external light L2 may not reach the diffraction plate 58. Thus, only reflected light of the light L1 incident to the diffraction plate 58 may be viewed from a rear side of the diffraction plate 58, and thus, the second screen DP2 may be a screen of a display apparatus exclusively for virtual reality.

When the rotating polarizer 62 is maintained in an un-rotated state in the second screen DP2, that is, the rotating polarizer 62 maintains a polarization state that is the same as the second polarizer 56, the P-polarized light L2P enters the diffraction plate 58 through the rotating polarizer 62 and the second polarizer 56. Since the diffraction plate 58 is transparent with respect to the P-polarized light L2P, the P-polarized light L2P may be viewed through the diffraction plate 58, and also, reflected light of the light L1 incident to the diffraction plate 58 may be viewed from a rear side of the diffraction plate 58. As a result, the P-polarized light L2P including an image of the real world together with the reflected light of the light L1 including an image of a virtual world may be viewed from the diffraction plate 58, and thus, the second screen DP2 may be a screen of a display apparatus exclusively for augmented reality in which a virtual reality image is superimposed on an image of the real world.

Figure 9:
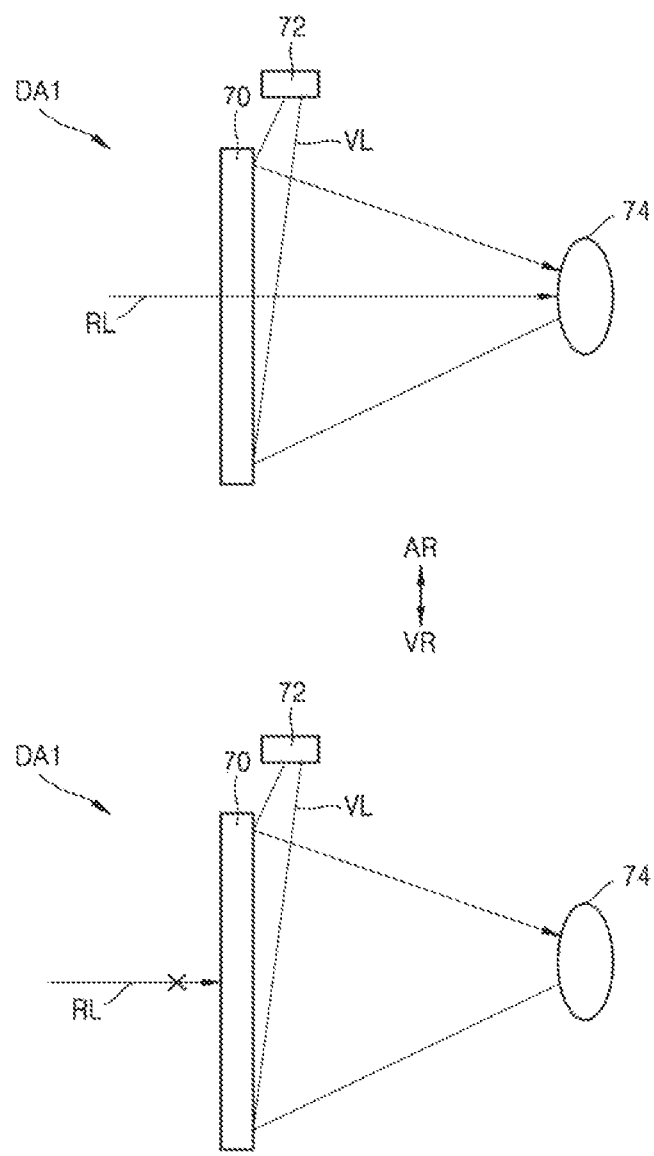
FIG. 9 is a cross-sectional view of a first display apparatus for augmented reality and/or virtual reality, according to an embodiment.

FIG. 9 shows a display apparatus DA1 (hereinafter, a first display apparatus DA1) for augmented reality and/or virtual reality, according to an embodiment.

Referring to an upper portion of FIG. 9, the first display apparatus DA1 includes a screen 70 on which an image is displayed and a virtual image supply unit 72 configured to supply a virtual reality image to the screen 70. The screen 70 may be the first screen DP1 of FIG. 7, the second screen DP2 of FIG. 8, or may include the first screen DP1 or the second screen DP2. The virtual image supply unit 72 may be a projection display unit projecting a virtual reality image to the screen 70 or may include such a projection display unit. External light RL is transmitted to a user 74 through the screen 70, and may be transmitted to the eye of the user 74. The external light RL may be the external light L2 described with reference to FIGS. 7 and 8. Light VL emitted from the virtual image supply unit 72 includes the virtual reality image. The light VL is reflected at the screen 70 and then transmitted to the user 74. The external light RL and the light VL including the virtual reality image are transmitted together to the user 74 through the screen 70. Accordingly, the user 74 may view augmented reality.

Meanwhile, as depicted on a lower portion of FIG. 9, when the external light RL is blocked by controlling the screen 70, only the light VL including the virtual reality image is transmitted to the user 74. Accordingly, the user 74 only views virtual reality.

Figure 10:
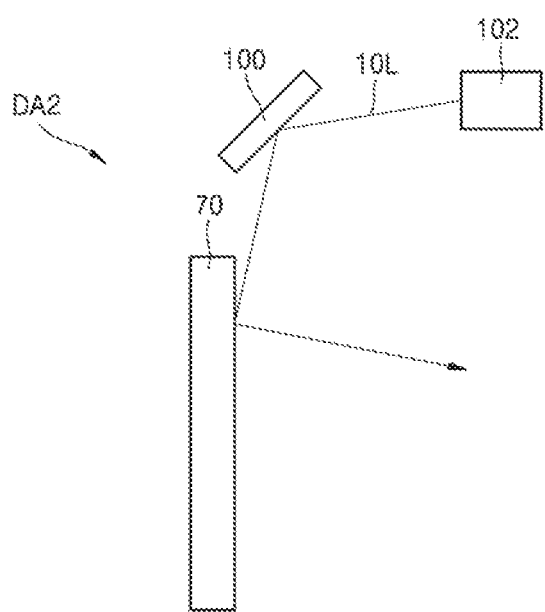
FIG. 10 is a cross-sectional view of a second display apparatus for augmented reality and/or virtual reality, according to an embodiment.

FIG. 10 shows a display apparatus DA2 (hereinafter, a second display apparatus DA2) for augmented reality and/or virtual reality, according to an embodiment. Like reference numerals are used to indicate elements identical to the elements described with reference to FIG. 9, and the descriptions thereof will be omitted.

Referring to FIG. 10, the second display apparatus DA2 includes a screen 70 on which an image is displayed, a virtual image supply unit 102 configured to supply a virtual reality image to the screen 70, and a reflective member 100. The reflective member 100 is arranged between the screen 70 and the virtual image supply unit 102. Light 10L emitted from the virtual image supply unit 102 includes a virtual reality image. The light 10L is reflected by the reflective member 100 and enters the screen 70. The reflective member 100 may be arranged on a location where light reflected by the reflective member 100 enters the screen 70 with a predetermined incident angle. As an example, the reflective member 100 may be arranged so that light emitted from the reflective member 100 enters the screen 70 with an incident angle greater than 45°, for example, greater than 75°. The condition of the reflective member 100 may be satisfied by controlling an inclination angle of the reflective member 100 or by mutually controlling an angle between the reflective member 100 and the screen 70. The reflective member 100 may be a mirror or a prism having a reflection surface to irradiate the light 10L onto a whole region of the screen 70 on which an image is displayed or may include the mirror or the prism.

The first and second display apparatuses DA1 and DA2 of FIGS. 9 and 10 may be formed as a portable type to be carried by a user.

Figure 11:
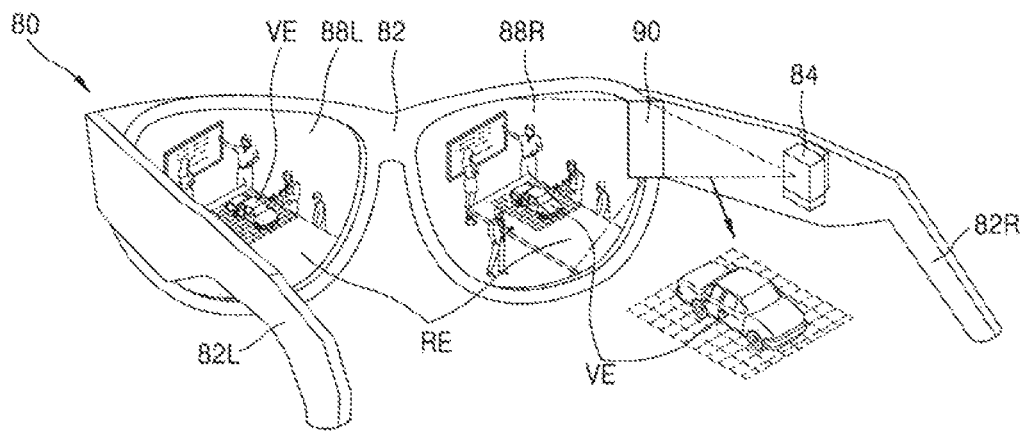
Figure 12:
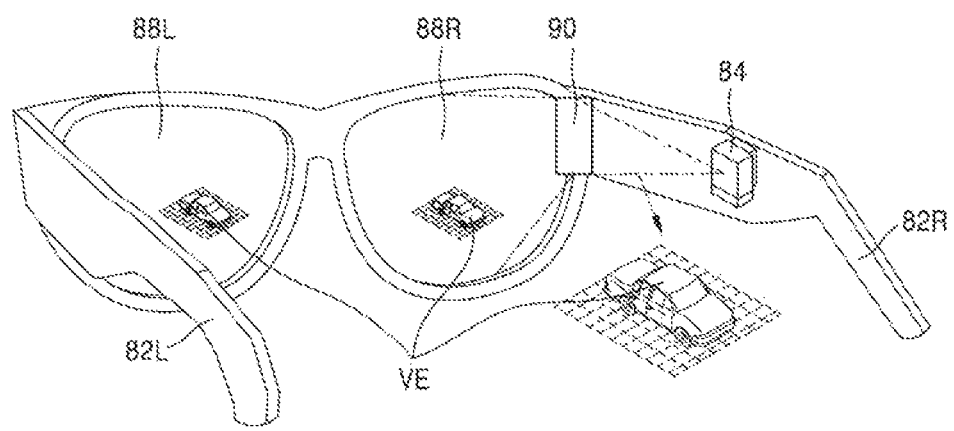

FIGS. 11 and 12 show examples in which the display apparatus DA2 of FIG. 10 is formed in a glasses type.

FIG. 11 shows a case in which an augmented reality image is shown and FIG. 12 shows a case in which only a virtual reality image is shown.

Referring to FIG. 11, display glasses 80 for augmented reality and/or virtual reality include a first eyeglasses frame 82 and first and second eyeglasses 88L and 88R respectively mounted on right and left sides of the first eyeglasses frame 82, an image projection unit 84, and a reflection member 90. A second eyeglasses frame 82L and a third eyeglasses frame 82R respectively are connected to both sides of the first eyeglasses frame 82. The second eyeglasses frame 82L and the third eyeglasses frame 82R respectively are parts to be hung on left and right ears of a user. The first eyeglasses frame 82 may have a shape similar to that of an eyeglasses frame on which eyeglasses of ordinary glasses are mounted, but may have a shape capable of blocking inflow of external light through regions other than the first and second eyeglasses 88L and 88R as much as possible. As an example, a fence that blocks inflow of light to the first eyeglasses frame 82 around the first and second eyeglasses 88L and 88R may be provided. The first eyeglass 88L may correspond to the left eye of the user, and the second eyeglass 88R may correspond to the right eye of the user. The first and second eyeglasses 88L and 88R are regions where an image of augmented reality and/or virtual reality is displayed, and may be the screen 70 of FIG. 9 or may include the screen 70.

The image projection unit 84 is a unit that supplies a virtual reality image, and may correspond to the virtual image supply unit 102 of FIG. 10. The image projection unit 84 may be provided on an inner side of the second eyeglasses frame 82L corresponding to an inner side of the third eyeglasses frame 82R. The reflection member 90 may be a mirror or a prism or may include the mirror or the prism. In FIG. 11, reference numeral RE indicates a real image viewed through the first and second eyeglasses 88L and 88R, that is, incident to the first and second eyeglasses 88L and 88R, that is, an image of a real world. Also, reference numeral VE indicates a virtual reality image provided from the image projection unit 84. In FIG. 11, an image displayed on the first and second eyeglasses 88L and 88R shows an example of an image of augmented reality in which the image of the real world RE overlaps the virtual reality image VE supplied from the image projection unit 84.

Meanwhile, when a display operation of the first and second eyeglasses 88L and 88R is controlled, external light (for example, P-polarized light) may not reach inner surfaces of the first and second eyeglasses 88L and 88R. As a result, as depicted in FIG. 12, an image of the real world is not displayed on the first and second eyeglasses 88L and 88R, and only an image of virtual reality supplied from the image projection unit 84 is displayed. That is, a virtual reality image is displayed on the first and second eyeglasses 88L and 88R, and thus, the display glasses 80 becomes a display apparatus for virtual reality. Various displays may be used as the image projection unit 84, for example, a digital light processing (DLP) display, a digital micromirror device (DMD) display, or a liquid crystal on silicon (LCoS) display may be used as the image projection unit 84.

Next, a method of manufacturing a screen according to an embodiment will be described.

FIGS. 13 through 18 show an operation of forming a grating plate having a meta-surface on a polarizer in a screen according to an embodiment.

Figure 13:
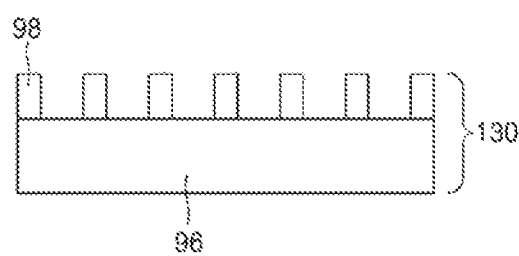
FIGS. 13 through 18 are cross-sectional views illustrating a method of manufacturing a grating plate having a meta-surface on a polarizer in a screen, according to an embodiment.

FIG. 13 shows a cross-sectional view of a polarizer 130. The polarizer 130 may correspond to the second polarizer 56 of FIGS. 7 and 8. The polarizer 130 includes a transparent substrate 96 and a plurality of wire grid polarizer patterns 98 on the transparent substrate 96. The transparent substrate 96 may be, for example, a glass substrate. The plurality of wire grid polarizer patterns 98 may be arranged to be transparent with respect to P-polarized light and to block S-polarized light. Accordingly, if light incident from a lower side of the transparent substrate 96 as shown in FIG. 13 is P-polarized light, the P-polarized light may pass through the polarizer 130, and if the light incident from the lower side of the transparent substrate 96 is S-polarized light, the S-polarized light may not pass through the polarizer 130. The plurality of wire grid polarizer patterns 98 are spaced apart from each other by a given gap. The gap may be constant.

Figure 14:
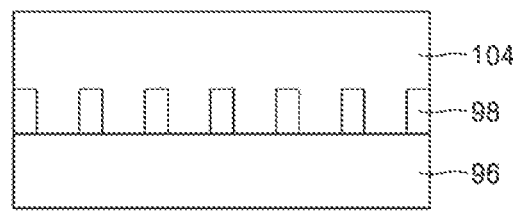
Figure 15:
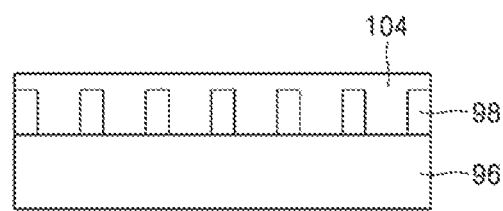

Next, as depicted in FIG. 14, an intermediate material layer 104 covering the plurality of wire grid polarizer patterns 98 and filling gaps between the plurality of wire grid polarizer patterns 98 may be formed on the transparent substrate 96. The intermediate material layer 104 may be a material layer transparent with respect to light. For example, the intermediate material layer 104 may be a silicon oxide layer (for example, a $SiO_2$ layer). After the intermediate material layer 104 is formed, an upper surface of the intermediate material layer 104 is flattened by using a planarizing process. The planarizing process may be an etching process, and a thickness of the intermediate material layer 104 is reduced to a set thickness through the etching process (refer to FIG. 15). The etching process may be performed under a condition that the plurality of wire grid polarizer patterns 98 is not exposed from an upper surface of the intermediate material layer 104 as shown in FIG. 15.

Figure 16:
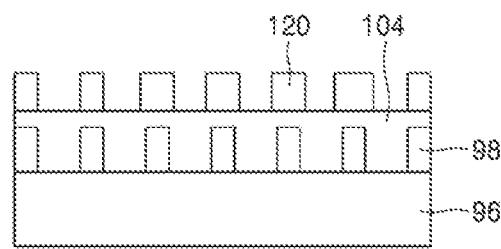

After the etching process is completed, as depicted in FIG. 16, a plurality of diffraction patterns 120 are formed as a meta-pattern on the intermediate material layer 104. Accordingly, a meta-surface including the plurality of diffraction patterns 120 is formed on the intermediate material layer 104. The plurality of diffraction patterns 120 may be formed by using a nano-imprinting method. Accordingly, the method of manufacturing a screen according to an embodiment may be readily applied to a process manufacturing a large diameter screen. Accordingly, production cost may be reduced. One or more of the dimensions (for example, pitch, width, height, etc.) of the plurality of diffraction patterns 120 are less than a wavelength of incident light, and the plurality of diffraction patterns 120 may be designed by using, for example, a Rigorous Coupled-Wave Analysis (RCWA). The plurality of diffraction patterns 120 may be formed to correspond to the plurality of diffraction patterns 34 of FIG. 1. Accordingly, the plurality of diffraction patterns 120 may be concavely formed with respect to incident light, that is, may be convexly formed in a travelling direction of incident light for high-efficiency scattering with respect to first order diffraction light. In other words, each individual diffraction pattern 120 may include a curved ridge having a center of curvature positioned in a direction of a light source of the incident light. The refractive index of the plurality of diffraction patterns 120 may be 2.5 or less, and, for example, for high efficiency operation and small aspect ratio, the refractive index of the plurality of diffraction patterns 120 may be in a range from about 1.35 to about 2.5. The plurality of diffraction patterns 120 may be formed by including a low loss dielectric material, such as polymer or $SiO_2$. Widths of some of the plurality of diffraction patterns 120 may be different from the others. As an example, widths of some of the plurality of diffraction patterns 120 may be equal to that of the plurality of wire grid polarizer patterns 98, and widths of the remaining diffraction patterns 120 may be different from that of the plurality of wire grid polarizer patterns 98. As an example, a width of each of the plurality of diffraction patterns 120 may be different from that of the plurality of wire grid polarizer patterns 98.

Figure 17:
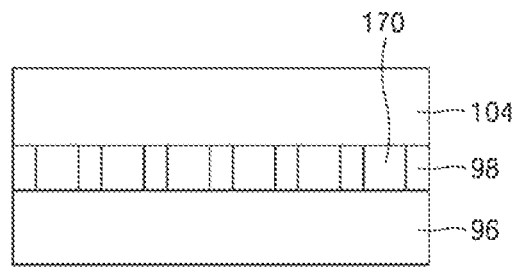
Figure 18:
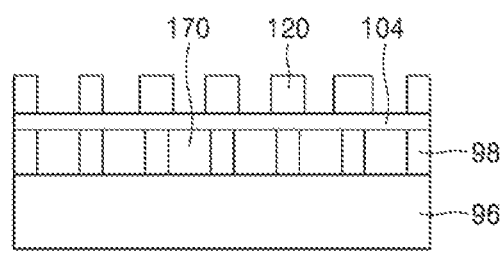

FIGS. 17 and 18 show a process in which the intermediate material layer 104 is deposited in a method different from the method of FIG. 14.

Referring to FIG. 17, in forming the intermediate material layer 104 on the transparent substrate 96, the intermediate material layer 104 does not fill gaps between the plurality of wire grid polarizer patterns 98, but is instead formed on top of the plurality of wire grid polarizer patterns 98 and covers the gaps between the plurality of wire grid polarizer patterns 98. That is, the intermediate material layer 104 may be formed in a shape supported by the plurality of wire grid polarizer patterns 98. Accordingly, voids 170 may be formed between the plurality of wire grid polarizer patterns 98. A method of depositing the intermediate material layer 104 as the shape depicted in FIG. 17 may be different from the method of depositing the intermediate material layer 104 as depicted in FIG. 14. In FIG. 14, the intermediate material layer 104 may be formed by using, for example, an atomic layer deposition method, and in FIG. 17, the intermediate material layer 104 may be formed by using a deposition method having a lower deposition precision than the atomic layer deposition method. After the intermediate material layer 104 is formed, as depicted in FIG. 18, the thickness of the intermediate material layer 104 is reduced, and the plurality of diffraction patterns 120 are formed thereon. These processes may be the same as the processes described with reference to FIGS. 15 and 16. When the plurality of diffraction patterns 120 are regarded as diffraction gratings or a diffraction grating layer, FIG. 18 shows a layer configuration in which a dielectric layer called the intermediate material layer 104 is inserted between the substrate 96+98 and the plurality of diffraction patterns 120, and in this layer configuration, the thickness of the intermediate material layer 104 may be n times (n=1, 2, 3, . . . ) (i.e., an integral multiple) of a wavelength of incident light.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A grating device comprising:
a substrate; and
a diffraction grating on a surface of the substrate,
wherein the diffraction grating comprises a plurality of meta-diffraction patterns that are separated from each other and configured to converge an incident light by diffracting the incident light, wherein each meta-diffraction pattern from among the plurality of meta-diffraction patterns has a curved shape in a direction parallel to the substrate,
wherein the plurality of meta-diffraction patterns are not connected to each other,
wherein the plurality of meta-diffraction patterns is transparent to p-polarized light and reflects s-polarized light,
wherein the plurality of meta-diffraction patterns comprises a group of meta-diffraction patterns,
wherein each meta-diffraction pattern from among the group of meta-diffraction patterns comprises a main diffraction pattern and an auxiliary diffraction pattern that protrude from the substrate and do not directly contact each other, and
wherein the auxiliary diffraction pattern of each meta-diffraction pattern comprises a first auxiliary diffraction pattern and a second auxiliary diffraction pattern that do not directly contact each other.

2. The grating device of claim 1, wherein each meta-diffraction pattern from among the plurality of meta-diffraction patterns has a respective height that causes, for light that is incident at an angle greater than 45° with respect to the plurality of meta-diffraction patterns, destructive interference between light reflected by an upper surface of the meta-diffraction pattern and light reflected by a bottom surface of the meta-diffraction pattern.

3. The grating device of claim 1, further comprising a dielectric layer arranged between the substrate and the diffraction grating,
wherein a thickness of the dielectric layer is an integral multiple of a wavelength of incident light.

4. The grating device of claim 1, wherein a refractive index of the diffraction grating is in a range from about 1.35 to about 2.5.

5. The grating device of claim 1, wherein each meta-diffraction pattern from among the plurality of meta-diffraction patterns shows a respective diffraction characteristic that depends on a formed location of the meta-diffraction pattern.

6. The grating device of claim 1, wherein the substrate comprises a reflective wire grid polarizer.

7. The grating device of claim 1, wherein a respective dimension of each meta-diffraction pattern from among the plurality of meta-diffraction patterns is less than a wavelength of light incident to the plurality of meta-diffraction patterns.

8. The grating device of claim 1, wherein the auxiliary diffraction patterns are arranged so that a negative diffraction angle range having a high diffraction efficiency is obtained as a number of auxiliary diffraction patterns increases.

\* \* \* \* \*